United States Patent [19]

Cho

[11] Patent Number: 4,521,532

[45] Date of Patent: Jun. 4, 1985

[54] MONOLITHIC CATALYTIC CONVERTER FOR IMPROVED THERMAL PERFORMANCE

[75] Inventor: Byong K. Cho, Sterling Heights, Mich.

[73] Assignee: General Motors Corporation, Detroit, Mich.

[21] Appl. No.: 602,747

[22] Filed: Apr. 23, 1984

[51] Int. Cl.³ .............................................. B01J 35/04
[52] U.S. Cl. .................................. 502/439; 428/116; 428/188; 502/527; 422/180
[58] Field of Search ........................ 502/300, 527, 439; 422/180; 428/116, 188

[56] References Cited

U.S. PATENT DOCUMENTS

| | | | |
|---|---|---|---|
| 3,983,283 | 9/1976 | Bagley | 428/116 |
| 4,042,738 | 8/1977 | Gulati | 428/116 |
| 4,127,691 | 11/1978 | Frost | 428/116 |
| 4,135,018 | 1/1979 | Bonin et al. | 428/116 |
| 4,139,144 | 2/1979 | Cunningham | 228/182 |
| 4,177,307 | 12/1979 | Torii et al. | 428/116 |
| 4,233,351 | 11/1980 | Okumura et al. | 502/527 X |

*Primary Examiner*—W. J. Shine
*Attorney, Agent, or Firm*—R. W. Tung

[57] ABSTRACT

An automobile catalytic converter of extruded ceramic monolithic honeycomb structure for treatment of automotive exhaust gas. The monolithic structure contains longitudinally extended channels formed of thin walls in a periodic pattern of cross sections of different areas to induce different flow velocities of the exhaust gas in the immediate adjacent channels. Temperature gradients thereby produced between the adjacent channels promote heat transfer in the transverse direction of the honeycomb structure to prevent the formation of maximum temperature in each channel at the same longitudinal location of the channel wall.

3 Claims, 15 Drawing Figures

MONOLITHIC CATALYTIC CONVERTER FOR IMPROVED THERMAL PERFORMANCE

FIELD OF THE INVENTION

This invention relates to an automobile catalytic converter of extruded ceramic monolithic honeycomb structure for treatment of automotive exhaust gas. The monolith is designed to have periodic non-uniform openings for improved thermal performance.

BACKGROUND OF THE INVENTION

Monolithic catalytic converters typically include an extruded ceramic honeycomb structure of a refractory material such as cordierite ($2MgO.5SiO_2.2Al_2O_3$) or mullite ($3Al_2O_3.2SiO_2$). This ceramic material is wash coated with a thin layer of a catalyst carrier such as alumina ($Al_2O_3$) or zirconium oxide ($ZrO_2$) of very high surface area. The high surface area carrier is usually impregnated with a noble metal such as platinum (Pt), palladium (Pd), rhodium (Rh) or a mixture thereof. After the honeycomb structure and the catalyst are heated up to the activation temperature, noxious components of the automobile exhaust gas such as unburned hydrocarbons (UHC), carbon monoxide (CO) and nitrogen oxides (NOx) react in the catalyzed reaction forming harmless gaseous products.

Each catalyst material has a light-off temperature at which the rate of the catalyzed reaction increases from very low to very high levels. In designing a monolithic converter for automobile emission controls, it is desirable to have a honeycomb structure in such a geometry that it can be heated up quickly during the cold start of a vehicle.

A potential problem in the use of monolithic honeycomb structure converters is the melt-down of the monolithic core at very high temperatures. This occurs due to the combined effect of the following two causes. First, high temperatures are generated in each channel at or near the catalyzed reaction sites on the channel walls by the extremely exothermic chemical reactions in the exhaust gas. Secondly, in present monolithic converters having uniformly cross sectioned flow channels, the exhaust gas flow velocity in each channel is the same. This means that the maximum temperature, i.e., a hot spot, occurs at the same longitudinal location in each channel. The cumulative effect of all the hot spots in the same region of the monolith can produce a melt-down of the monolithic core. The probability of occurrence of a melt down is higher when an automobile is operated under highly unstable conditions. For instance, during the deceleration phase of a vehicle or the malfunction of a spark plug, a sudden increase in the reactant concentration (UHC, CO, NOx) greatly increases the maximum temperature at localized hot spots.

The problems of uneven heating and subsequent thermal shock occurrence have been recognized by other workers in monolithic converters. Various means were proposed to remedy the effect of thermal shock. One of such means was to design uniform non-square shaped honeycomb cells so that the cell walls could withstand higher thermal stresses and provide improved thermal shock resistance. Another was to provide discontinuities in the cell walls extending longitudinally through the structure and transversely through the cell walls so that the monolith could better withstand uneven thermal expansion. However, much of these efforts were remedial in nature to lessen the effect of the thermal shock rather than preventing it from occurring. Moreover, the concept of the hot spot formation was generally not recognized by others in the field.

OBJECTS OF THE INVENTION

Accordingly, it is an object of this invention to provide a monolithic honeycomb structure for a catalytic converter in which the formation of localized hot spots at the same longitudinal location in each channel can be effectively prevented. This is achieved by providing a periodic pattern of flow channels in the monolith that have different cross sections.

Another object of this invention is to provide a monolithic honeycomb structure for catalytic converters that can be quickly heated up. This may also be achieved by providing different cross sections in flow channels resulting in different flow velocities in different channels of the monolith.

SUMMARY OF THE INVENTION

In accordance with my invention, a monolithic honeycomb structure for a catalytic converter without the potential melt-down problem can be constructed.

In a prior art monolith with uniform channel design where the exhaust gas flow velocity in each channel is the same, the temperature profile in one channel is essentially the same as that in the adjacent channel. As a consequence, there is little heat transfer between the two adjacent channels because there is no temperature gradient between them.

In a monolith with nonuniform periodic channel design, the temperature profile along the length of each immediate adjacent channel is different. In accordance with a preferred embodiment of my invention I employ a monolith design having fast exhaust gas flow channels and slow exhaust gas flow channels arranged in an alternating pattern as in a checkerboard design. Each slower exhaust gas flow channel is neighbored by four channels permitting faster exhaust gas flow velocity. These different flow velocities in adjacent channels lead to different temperature profiles in the channels. Maximum temperature is reached closer to the entrance in the slow channels and nearer the exit in the fast channels.

At a distance near to the entrance of the channel, the temperature in a slow channel is higher than that in its neighboring fast channel which causes heat transfer from the slow channel to the fast channel through the channel wall. This temperature gradient is reversed at a distance closer to the exit of the monolith, thus promoting a heat transfer from the fast channel to the slow channel.

The benefits obtained from this flow velocity induced heat transfer are two-fold. First, the longitudinal positions at which the maximum temperature occurs are now different and spaced apart in the adjacent fast and slow channels. This effectively eliminates the potential melt-down problem caused by the cumulative effect of maximum temperature occurring at the same longitudinal position in the monolith. Secondly, heat transfer occurs between the slow and the fast channels to achieve a shorter warm-up time in the fast channels for more efficient operation of the converter. Consequently, the overall warm-up time for a monolith during vehicle cold start is reduced.

My invention of periodic channel design can be carried out in various ways. The following three embodiments are illustrative.

The first type of periodic channel design is an orifice-type monolith. The channels all have substantially the same cross section along most of their length. However, the entrances to alternate channels are obstructed by small orifices. The gas flow in such channels is relatively slow. The entrances to the fast channels are unobstructed. The flow rate of the exhaust gas is faster through the fast channel than through the slow channel. The desired ratio of the flow velocities between adjacent channels can be easily obtained by adjusting the size of the orifice of the slow channels.

The second type of periodic channel design is a diagonal type monolith. A part or the whole length of the slow channels are divided diagonally by flat strips, while the fast channels remain undivided. The longitudinal length of the diagonal strip determines the ratio of the flow velocity between the fast and the slow channels. In this design, the slow channel has more active catalytic surface area per unit channel volume than that in the fast channel.

The third type of periodic channel design is a cross-type monolith. The slow channel is divided into four equal passages by the insertion of a cross member over a partial or the whole length of the channel. The fast channel remains undivided. The ratio of the flow velocity between the fast and the slow channels is adjusted by the longitudinal length of the crossed strip. Compared to the diagonal type monolith, the slow channel has even more active catalytic surface area per unit channel volume than that in the fast channel.

DETAILED DESCRIPTION OF A PREFERRED EMBODIMENT

Figure 1:
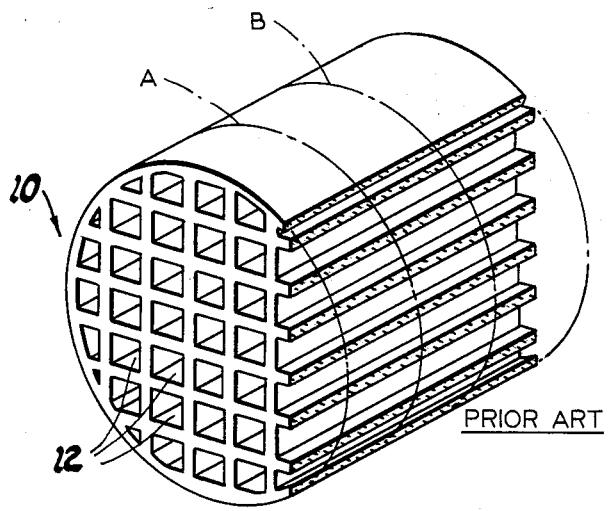
FIG. 1 is an isometric view of a uniform monolith with a portion broken away.

Reference is made initially to FIG. 1 where a prior art uniform monolith 10 is shown with a broken away section exposed. It is to be noted that the dimensions of the channel openings 12 are all the same. They are exaggerated in size for purpose of illustration.

Figure 2:
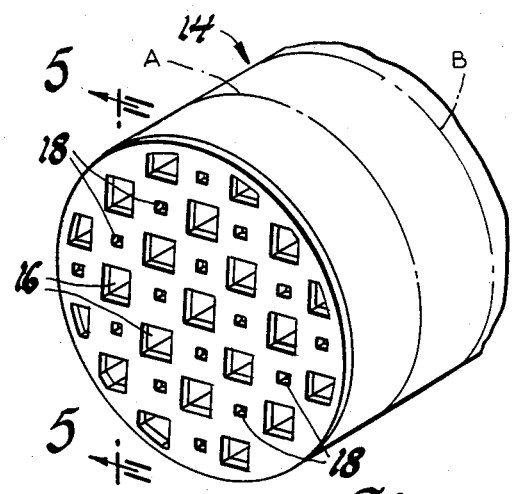
FIG. 2 is an isometric view of an orifice-type nonuniform periodic monolith.

In contrast to a uniform monolith, an orifice-type nonuniform periodic monolith 14 is shown in FIG. 2 where each fast channel 16 has as immediate neighbors four slow channels 18, and vice versa. A symmetrical relationship exists among the channels so that each channel has a different temperature profile in the longitudinal direction than that of its immediate adjacent neighbor.

There are two prerequisites for a catalytic reaction to occur, either the monolith temperature be sufficiently high or the residence time be sufficiently long. The residence time is defined as the time period available for the reactants in the exhaust gas to come into contact with the catalyst on the monolith wall. In a fast channel, the reactants must travel a longer distance before they reach the activation temperature of the catalyzed reaction. Alternatively, a longer residence time is required for the faster moving exhaust gas. As a consequence, the maximum temperature of the fast channel occurs further downstream of the monolith than that in the slow channel.

The temperature profiles in the fast and the slow channels can be described as follows. Near to the entrance of the monolith, temperature in the slow channel 18 (FIG. 2) is higher than that in the fast channel 16 such that heat transfers from the slow channel to the fast channel. This trend is reversed near the exit of the monolith.

Figure 3:
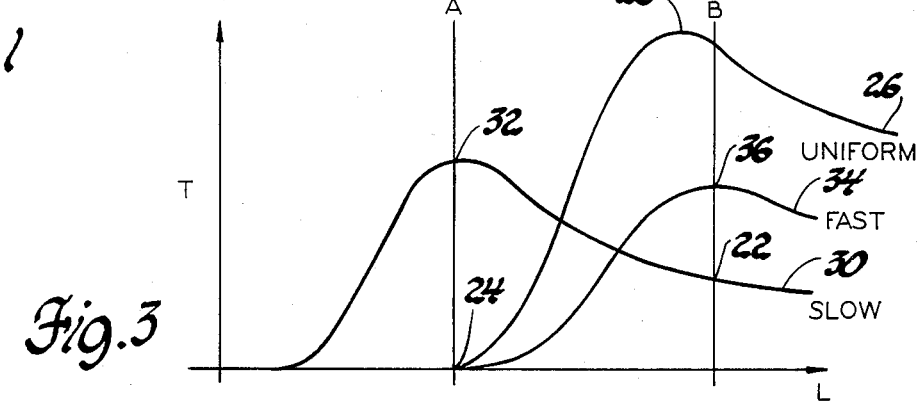
FIG. 3 shows temperature profile curves in the longitudinal direction in a uniform monolith and a nonuniform periodic monolith.

FIG. 3 illustrates typical temperature profile curves along the longitudinal direction of a uniform monolith and a nonuniform monolith. A non-uniform periodic monolith 14 (FIG. 2) having fast and slow channels splits a single curve 26 with maximum temperature 28 for a uniform monolith into two curves 30 and 34 each having significantly reduced maximum peak temperatures 32 and 36. The temperature profile curve 30 for the slow channel shows that temperature in the slow channel rises faster than that in the fast channel 34 for reasons previously discussed. As a result, a large temperature gradient exists between the fast channel 16 (FIG. 2) and the slow channel 18 promoting heat transfer between the two adjacent channels. The effect of this heat transfer is evident by comparing the maximum temperature reached in the fast channel of a nonuniform monolith 36 with that in a uniform monolith 28.

Figure 4A:
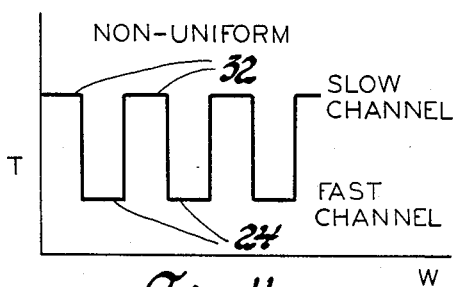
FIG. 4a shows a temperature profile in the transverse direction of a nonuniform monolith at cross section A in FIG. 2.
Figure 4B:
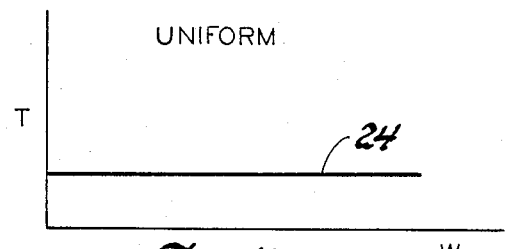
FIG. 4b shows a temperature profile in the transverse direction of a uniform monolith at cross section A in FIG. 1.
Figure 4C:
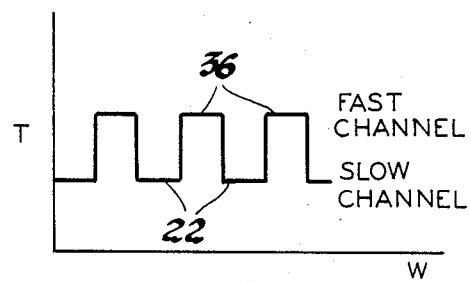
FIG. 4c shows a temperature profile in the transverse direction of a nonuniform monolith at cross section B in FIG. 2.
Figure 4D:
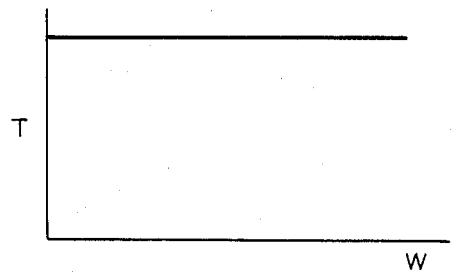
FIG. 4d shows a temperature profile in the transverse direction of a uniform monolith at cross section B in FIG. 1.

The heat transfer between adjacent fast and slow channels can also be explained by FIGS. 4a throuqh 4d, referring to bed temperature profiles (in the transverse direction of the monolith) taken at cross sections A and B in FIGS. 1 and 2. In FIG. 4a, the temperature relationship in the fast and slow channel at cross section A (FIG. 2) is illustrated as a step function of the transverse channel width (w). A large temperature gradient exists between the slow channel 18 (FIG. 2) and the fast channel 16 to promote heat transfer from the former to the latter. In contrast, the temperature profile in a uniform monolith at the same cross section A (FIG. 1) is shown in FIG. 4b. A consistently low temperature 24 exists in the transverse direction of the monolith. At cross section B (FIG. 2), further downstream in the nonuniform monolith, the temperature relationship in the periodic monolith is reversed. This is shown in FIG. 4c where the temperature in the slow channel 18 (FIG. 2) has decreased while the temperature in the fast channel 16 has reached its maximum, reversing the step function relationship in FIG. 4a. Again, a temperature gradient exists between the fast channel and the slow channel to promote heat transfer between them, but this time from the fast channel to the slow channel. Through this process, efficient heat transfer is achieved to disperse the thermal energy between the fast and the slow channels along the whole length of the monolith instead of at a single region. The temperature profile in a uniform monolith at the same cross section B is shown in FIG. 4d. A consistently high temperature is shown existing across the channels presenting a potential problem of melt-down.

A second benefit of the nonuniform periodic monolith design is that the overall warm-up time of the monolith is shortened owing to the heat transfer between the fast and the slow channels. More efficient catalyzed reaction is possible through the more uniform bed temperature achieved.

The optimum ratio of the flow velocities between the fast and the slow channels depends upon the properties of the monolith substrate and on the kinetics of the specific chemical reactions.

Figure 5:
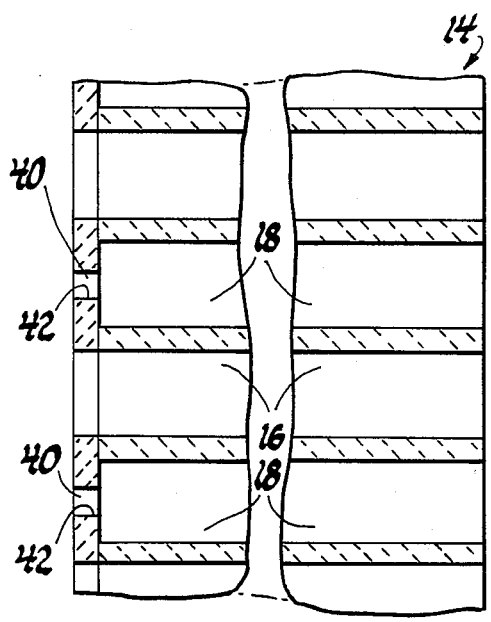
FIG. 5 is a view as indicated on line 5—5 in FIG. 2.

In FIG. 5, a sectional view of the nonuniform periodic monolith 14 (FIG. 2) containing fast and slow channels is shown. In the fast channel 16, exhaust gas enters without restriction and thus a higher flow velocity is obtained. In the slow channel 18, the exhaust gas enters through a restrictive orifice 40 at a reduced flow velocity. The size of the orifice opening 42 can be calculated by a typical flow equation.

A sample calculation for a desired orifice opening is shown below for a reduction of fifty percent in the flow velocity.

$$Q = A \left(\frac{P_2}{P_1}\right)^{\frac{1}{\gamma}} \left\{ \frac{2\gamma}{\gamma - 1} \frac{R_0 T_1}{M} \left[1 - \left(\frac{P_2}{P_1}\right)^{(\gamma-1)/\gamma}\right]\right\}^{\frac{1}{2}}$$

where Q is the volumetric flow rate in cm$^3$/sec, Q=VA, V is the flow velocity in cm/sec, A is the cross sectional area of the orifice opening, P$_1$ is the gas pressure prior to entry of the orifice, P$_2$ is the gas pressure after the entry of the orifice, $\gamma$ is the ratio of the specific heat of the exhaust gas at constant pressure to that at constant volume, R is the gas constant (8.314×10$^7$ erg/K mole), T$_1$ is the temperature of the exhaust gas prior to the entry of the orifice in K, and M is the molecular weight of the exhaust gas.

For an orifice with a square opening $$(0.1212)^2 \left(\frac{2847}{2}\right) =$$

-continued $$A (0.984)^{-\frac{1}{1.4}} \left\{ \frac{2.8}{0.4} \frac{8.314 \times 10^7 \times 773}{28.89} \left(1 - 0.984^{\frac{0.4}{1.4}}\right)\right\}^{\frac{1}{2}}$$

$A = 0.0025$ cm$^2$

The dimension of the square opening 42 (FIG. 5) in the orifice at a split ratio of 2:1 is 0.05 centimeters. A split ratio is defined as the ratio between the flow velocities in the fast channel and in the slow channel. Using this method of calculation, an orifice dimension can be readily obtained for a desired split ratio.

Figure 6:
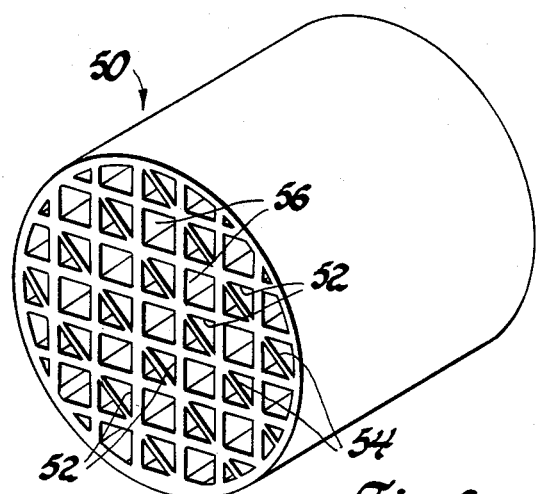
FIG. 6 is an isometric view of a diagonal-type periodic monolith.

An isometric view of a diagonal-type periodic monolith 50 is shown in FIG. 6. In this embodiment, the slow channels 52 are made by adding extruded dividing strips 54 while the fast channels 56 are not so encumbered. It is noted that in this design each fast channel 56 is neighbored by four slow moving channels 52, and vice versa.

Figure 7:
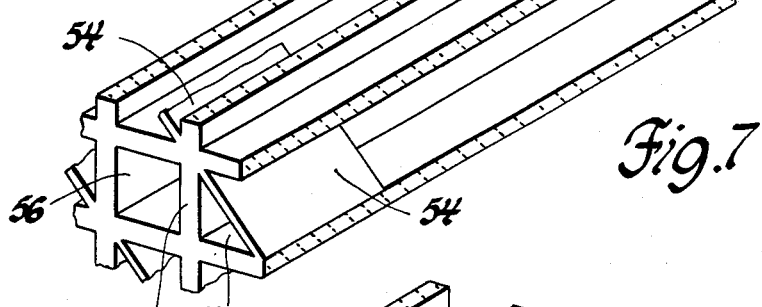
FIG. 7 is an enlarged fragmentary portion of FIG. 6 at a split ratio of 2:1.
Figure 8:
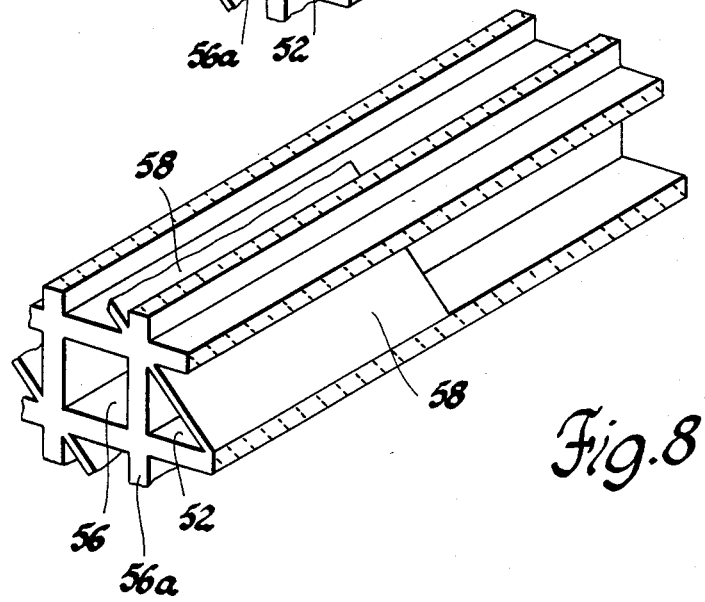
FIG. 8 is an enlarged fragmentary portion of another embodiment of FIG. 6 at a split ratio of 3:1.

FIG. 7 is an enlarged fragmentary portion of FIG. 6 showing detailed construction of the dividing strips 54. Heat transfer occurs through the common wall 56a between the slow channel 52 and the fast channel 56. When a split ratio of 2:1 is desired, only a short length of the strip 54 is necessary to obtain the desired flow velocity reduction in the slow channels 52. As the desired split ratio becomes larger, longer strip length 58 is necessary to achieve the desired reduction in the flow velocity. This is shown in FIG. 8 for a diagonal-type monolith having a split ratio of 3:1.

Figure 9:
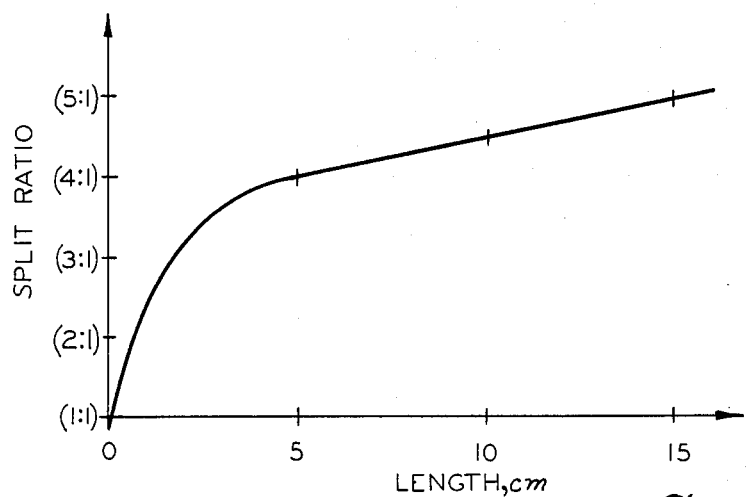
FIG. 9 shows the relationship between the split ratio and the longitudinal length of the monolith for a diagonal-type periodic monolith.

The length required of the dividing strip at a certain split ratio can be calculated by using standard equations for pressure drops in flow passages. The results calculated by one of these methods are shown in FIG. 9. It should be noted that at lengths larger than 15 centimeters, the resulting split ratios become too large to be practical.

Figure 10:
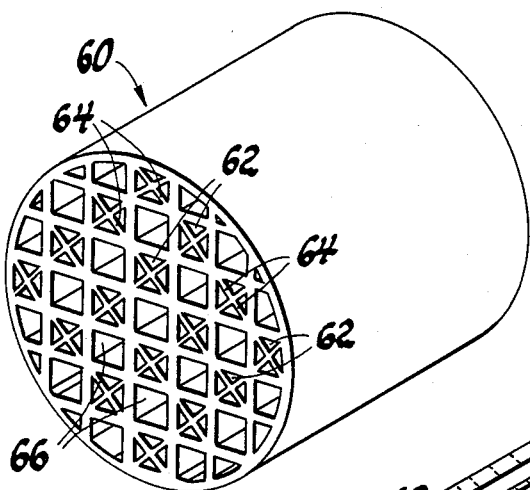
FIG. 10 is an isometric view of a cross-type periodic monolith.

An isometric view of a cross-type periodic monolith 60 is shown in FIG. 10. In this embodiment, the slow channels 62 are made by adding cross strips 64 to the fast channels 66. Each fast channel is neighbored by four slow channels, and each slow channel is neighbored by four fast channels.

Figure 11:
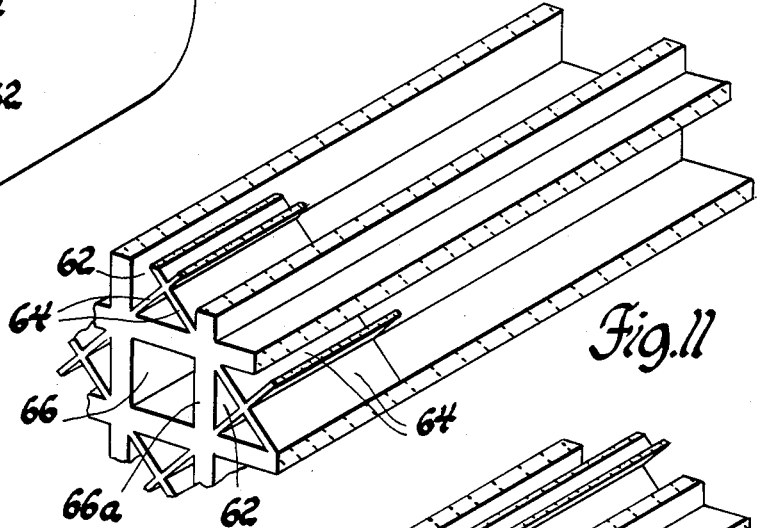
FIG. 11 is an enlarged fragmentary portion of FIG. 10 at a split ratio of 2:1.
Figure 12:
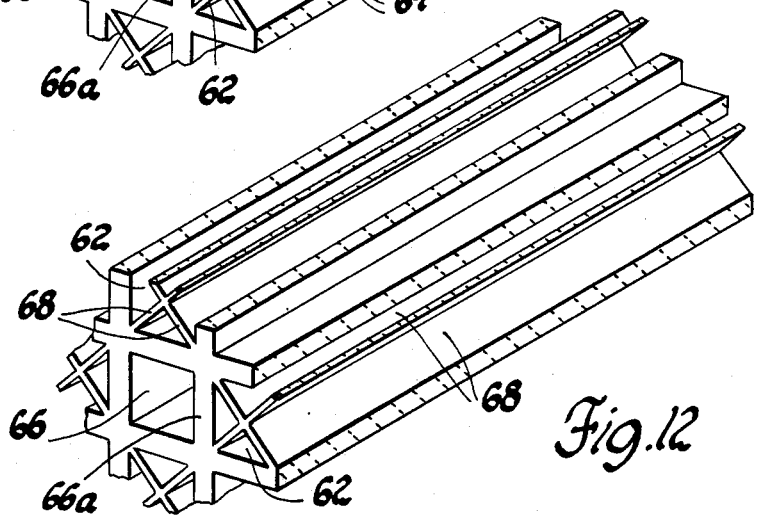
FIG. 12 is an enlarged fragmentary portion of another embodiment of FIG. 10 at a split ratio of 10:1 or larger.

A detailed channel design for a cross-type monolith is shown in FIG. 11. Heat transfer occurs through the common wall 66a between the slow channel 62 and the fast channel 66. It is noted that to obtain a desired split ratio of 2:1, only a very short length of the cross strips 64 is required. In FIG. 12, where the cross strips 68 are extended over the full length of the channel, a split ratio of 10:1 or greater is obtained.

To implement the diagonal design and the cross design monolith, it is recommended that different cross sectioned honeycomb structures can be extruded. Suitable lengths of the uniform monolith and the periodic monolith can then be joined together by mechanical means to obtain a periodic monolith at a desired split ratio.

While my invention has been described in terms of a preferred embodiment thereof, it is to be appreciated that those skilled in the art will readily apply these teachings to other possible variations of the invention.

The embodiments of the invention in which an exclusive property or privilege is claimed are defined as follows:

1. A monolithic honeycomb structure for treatment of automotive exhaust gas comprising a plurality of open-ended channels having interconnected walls extending longitudinally through the structure, said channels being formed to provide a periodic pattern of different cross-sectional gas flow areas such that each channel has a plurality of neighboring channels of different gas flow cross-sectional area to induce different flow velocities of the exhaust gas in adjacent channels, and to thereby produce temperature gradients between the adjacent channels to promote heat transfer in the transverse direction between them.

2. A monolithic honeycomb structure for treatment of automotive exhaust gas comprising a plurality of open-ended channels having interconnected walls extending longitudinally through the structure, said channels being formed of substantially the same cross section, and means partially closing the gas inlet to alternate channels to induce different flow velocities of the exhaust gas in adjacent channels, and to thereby produce temperature gradients between the adjacent channels to promote heat transfer in the transverse direction between them.

3. A monolithic honeycomb structure for treatment of automotive exhaust gas comprising a plurality of open-ended channels having interconnected walls extending longitudinally through the structure, said channels being formed in a periodic pattern of cross sections of different areas to induce different flow velocities of the exhaust gas in adjacent channels, and to thereby produce temperature gradients between the adjacent channels to promote heat transfer in the transverse direction between them, said periodic pattern of cross sections of different areas being provided by dividing the cross sections of preselected channels into two or more separate passages to at least the partial length of said channels.

* * * * *